(12) United States Patent
Anseth

(10) Patent No.: US 11,886,090 B2
(45) Date of Patent: Jan. 30, 2024

(54) EDIBLE ELECTRODES AND USES IN ELECTROPHORETIC DISPLAYS

(71) Applicant: E INK CORPORATION, Billerica, MA (US)

(72) Inventor: Jay William Anseth, Canton, MA (US)

(73) Assignee: E Ink Corporation, Billerica, MA (US)

( * ) Notice: Subject to any disclaimer, the term of this patent is extended or adjusted under 35 U.S.C. 154(b) by 512 days.

(21) Appl. No.: 17/289,326

(22) PCT Filed: Dec. 12, 2019

(86) PCT No.: PCT/US2019/065854
§ 371 (c)(1),
(2) Date: Apr. 28, 2021

(87) PCT Pub. No.: WO2020/123741
PCT Pub. Date: Jun. 18, 2020

(65) Prior Publication Data
US 2021/0373407 A1 Dec. 2, 2021

Related U.S. Application Data

(60) Provisional application No. 62/778,677, filed on Dec. 12, 2018.

(51) Int. Cl.
*G02F 1/1676* (2019.01)
*G02F 1/16757* (2019.01)
(Continued)

(52) U.S. Cl.
CPC ............ *G02F 1/1676* (2019.01); *G02F 1/167* (2013.01); *G02F 1/16757* (2019.01); *G02F 2001/1678* (2013.01)

(58) Field of Classification Search
CPC .... G02F 1/1676; G02F 1/16757; G02F 1/167; G02F 2001/1678
See application file for complete search history.

(56) References Cited

U.S. PATENT DOCUMENTS 3,293,078 A 12/1966 Frye
4,418,346 A 11/1983 Batchelder
(Continued)

FOREIGN PATENT DOCUMENTS

CN 103091926 A 5/2013
JP 2005327542 A * 11/2005
(Continued)

OTHER PUBLICATIONS

Kitamura, T. et al., "Electrical toner movement for electronic paper-like display", Asia Display/IDW '01, pp. 1517-1520, Paper HCS1-1 (2001).
(Continued)

*Primary Examiner* — Collin X Beatty
(74) *Attorney, Agent, or Firm* — Brian D. Bean

(57) ABSTRACT

Flowable electrode materials and articles constructed therefrom that can be used to make edible electrical connections. The flowable electrode material may comprise a liquid and a salt, wherein the liquid and the salt are edible. The flowable electrode material can be used to create electrodes, and those electrodes may be incorporated into an electro-optic display comprising a first electrode, a second electrode, and an electro-optic material located between the first electrode and the second electrode. In some embodiments, the first electrode, the second electrode, and the electro-optic material can be edible.

15 Claims, 6 Drawing Sheets

(51) Int. Cl.
  *G02F 1/167* (2019.01)
  *G02F 1/1675* (2019.01)

(56) References Cited

U.S. PATENT DOCUMENTS

| | | | |
|---|---|---|---|
| 5,490,614 A | 2/1996 | Sardynski | |
| 5,872,552 A | 2/1999 | Gordon, II et al. | |
| 6,130,774 A | 10/2000 | Albert et al. | |
| 6,144,361 A | 11/2000 | Gordon, II | |
| 6,172,798 B1 | 1/2001 | Albert et al. | |
| 6,184,856 B1 | 2/2001 | Gordon, II | |
| 6,225,971 B1 | 5/2001 | Gordon, II | |
| 6,241,921 B1 | 6/2001 | Jacobson et al. | |
| 6,271,823 B1 | 8/2001 | Gordon, II | |
| 6,195,582 B1 | 12/2001 | Scott | |
| 6,866,760 B2 | 3/2005 | Paolini, Jr. et al. | |
| 6,922,276 B2 | 7/2005 | Zhang et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,072,095 B2 | 7/2006 | Liang et al. | |
| 7,075,502 B1 | 7/2006 | Drzaic et al. | |
| 7,116,318 B2 | 10/2006 | Amundson et al. | |
| 7,144,942 B2 | 12/2006 | Zang et al. | |
| 7,170,670 B2 | 1/2007 | Webber | |
| 7,236,291 B2 | 6/2007 | Kaga et al. | |
| 7,312,784 B2 | 12/2007 | Baucom et al. | |
| 7,321,459 B2 | 1/2008 | Masuda | |
| 7,339,715 B2 | 3/2008 | Webber et al. | |
| 7,411,719 B2 | 8/2008 | Paolini, Jr. et al. | |
| 7,453,445 B2 | 11/2008 | Amundson | |
| 7,535,624 B2 | 5/2009 | Amundson et al. | |
| 7,679,814 B2 | 3/2010 | Paolini, Jr. et al. | |
| 7,715,088 B2 | 5/2010 | Liang et al. | |
| 7,839,564 B2 | 11/2010 | Whitesides et al. | |
| 8,009,348 B2 | 8/2011 | Zehner et al. | |
| 8,721,540 B2 | 5/2014 | Hafezi | |
| 8,999,050 B2 | 4/2015 | Ishida et al. | |
| 9,279,906 B2 | 3/2016 | Kang | |
| 10,444,553 B2 | 10/2019 | Laxton | |
| 10,468,203 B2 | 11/2019 | Jiang et al. | |
| 2010/0016703 A1 | 1/2010 | Batkin et al. | |
| 2011/0164301 A1 | 7/2011 | Paolini, Jr. et al. | |
| 2011/0207036 A1 | 8/2011 | Jeon et al. | |
| 2015/0005720 A1 | 1/2015 | Zang | |
| 2016/0012710 A1 | 1/2016 | Lu et al. | |
| 2017/0131612 A1* | 5/2017 | Paolini, Jr. | C08J 7/16 |

FOREIGN PATENT DOCUMENTS

| | | | | |
|---|---|---|---|---|
| KR | 20180113494 A | * | 10/2018 | |
| TW | 201412885 A | * | 4/2014 | B65G 17/126 |

OTHER PUBLICATIONS

Yamaguchi, Y. et al., "Toner display using insulative particles charged triboelectrically", Asia Display/IDW '01, pp. 1729-1730, Paper AMD4-4 (2001).

United States Patent and Trademark Office, PCT/US2019/065854, International Search Report and Written Opinion, dated Mar. 30, 2020.

National Oceanic and Atmospheric Administration, "Why is the Ocean Salty?", https://oceanservice.noaa.gov/facts/whysalty.html, Nov. 13, 2019. 1.

* cited by examiner

US 11,886,090 B2

EDIBLE ELECTRODES AND USES IN ELECTROPHORETIC DISPLAYS

RELATED APPLICATIONS

This application claims priority to U.S. Provisional Patent Application No. 62/778,677, filed Dec. 12, 2018. All patents, applications, and publications discussed herein are incorporated by reference in their entireties.

BACKGROUND

This invention relates to electro-optic displays, More specifically, this invention relates to systems of dynamic, edible electrophoretic displays and methods of making such displays. The invention additionally relates to a flowable electrode materials, methods of making such materials, and methods of using flowable electrode materials.

Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. As used herein, the term "microcavity electrophoretic display" may be used to cover both encapsulated and microcell electrophoretic displays.

Microcavity electrophoretic displays have been used for numerous applications within devices such as wristwatches, e-book readers, newspapers, mobile phones, and electronic shelf labels. Unlike traditional light-emitting diode (LED) and liquid-crystal displays (LCD), electro-optic displays are highly flexible in the materials they can be constructed from. Numerous material options exist for use as the charged particles, media, electrodes, and the other various components. This unique versatility allows for display constructions that are highly tailored to individual applications.

In view of the above, there exists a need for novel electro-optic configurations that would expand the usage of electro-optic dynamic displays, creating new display applications.

SUMMARY

The present disclosure seeks to expand upon previous electrop-optic display technology by providing systems and methods relating to flowable (edible) electrode materials and articles constructed therefrom that can be used to make edible electrophoretic displays.

In one aspect, the present disclosure provides a flowable electrode material that can be used to "draw" an electrical connection between two points. For example, the flowable electrode material may be used in the construction of an electro-optic display. Typically, the flowable electrode material will comprise a liquid and a salt. The liquid and the salt may be edible and "generally recognized as safe" ("GRAS") by the United States Food and Drug Administration ("FDA"). Such flowable materials can be used to incorporate electronic circuitry into food stuffs.

In another aspect, the present disclosure provides an article to be used in an electrophoretic display. The article comprises a first electrode, a second electrode, and an electrophoretic material; the electrophoretic material located between the first electrode and the second electrode. The first electrode, the second electrode, and the electrophoretic material are edible and "generally recognized as safe" ("GRAS") by the United States Food and Drug Administration ("FDA").

In yet another aspect, the present disclosure provides a method of making an article to be used in a dynamic, electrophoretic display. The method comprises a first step of creating a first electrode and a second electrode, wherein the first electrode and the second electrode are both edible; a second step of creating an electrophoretic material, the electrophoretic material located between the first electrode and the second electrode; and a third step of combining the first electrode, the second electrode, and the electrophoretic material, wherein the electrophoretic material is located between the first electrode and the second electrode.

These and other features, aspects, and advantages of the present invention will become better understood upon consideration of the following detailed description, drawings and appended claims.

DETAILED DESCRIPTION

Figure 1:
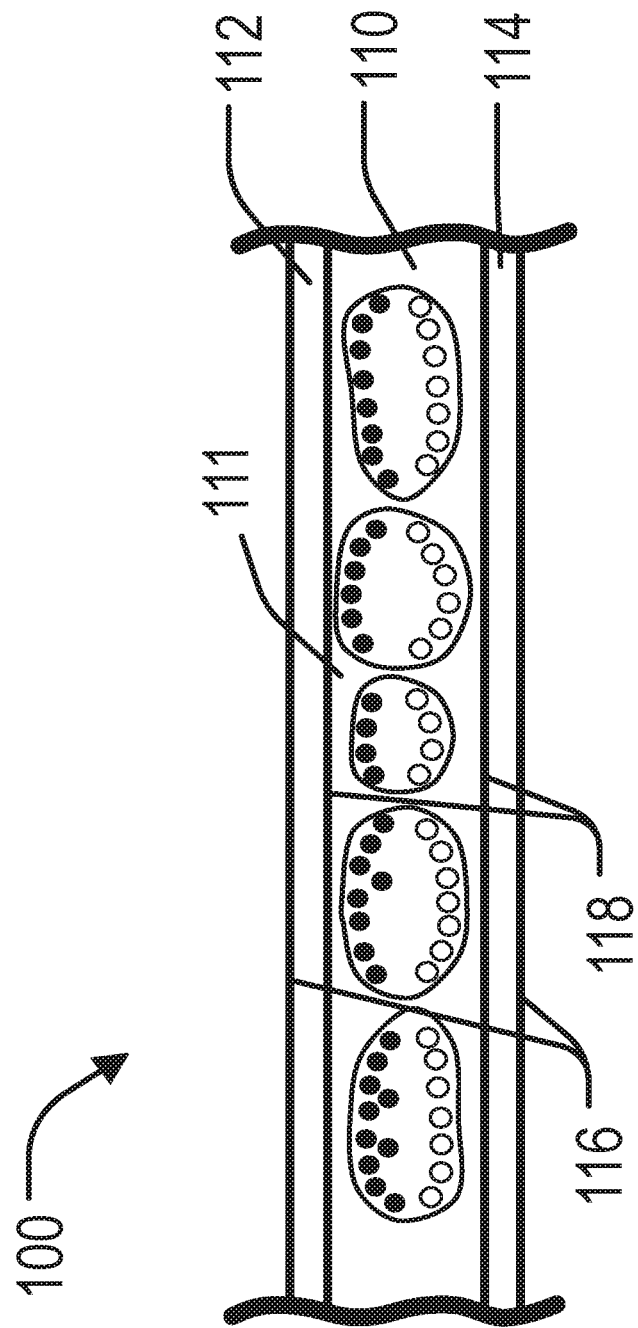
FIG. 1 is side view of an exemplary illustration of an article to be used in an electrophoretic display, according to one aspect of the present disclosure.

One type of electro-optic display, which has been the subject of intense research and development for a number of years, is the particle-based electrophoretic display, in which a plurality of charged particles moves through a fluid under the influence of an electric field. Electrophoretic displays can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Microcell structures, wall materials, and methods of forming microcells; see for example U.S. Pat. Nos. 7,072,095; and 9,279,906;

(d) Methods for filling and sealing microcells; see for example U.S. Pat. Nos. 7,144,942; and 7,715,088;

(e) Films and sub-assemblies containing electro-optic materials; see for example U.S. Pat. Nos. 6,982,178; and 7,839,564;

(f) Backplanes, adhesive layers and other auxiliary layers and methods used in displays; see for example U.S. Pat. Nos. 7,116,318; and 7,535,624;

(g) Color formation and color adjustment; see for example U.S. Pat. Nos. 7,075,502; and 7,839,564;

(h) Methods for driving displays; see for example U.S. Pat. Nos. 7,012,600; and 7,453,445;

(i) Applications of displays; see for example U.S. Pat. Nos. 7,312,784; and 8,009,348;

(j) Non-electrophoretic displays, as described in U.S. Pat. No. 6,241,921; and U.S. Patent Application Publication Nos. 2015/0277160; 2015/0005720; and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display (PDEPID), in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as subspecies of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E ink patents and applications, there is described a process for manufacturing an encapsulated electrophoretic display in which an encapsulated electrophoretic medium comprising capsules in a binder is coated on to a flexible substrate comprising indium-tin-oxide (TO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

As already noted, an encapsulated electrophoretic medium typically comprises electrophoretic capsules disposed in a polymeric binder, which serves to form the discrete capsules into a coherent layer. The continuous phase in a polymer-dispersed electrophoretic medium, and the cell walls of a microcell medium serve similar functions. It has been found by E Ink researchers that the specific material used as the binder in an electrophoretic medium can affect the electro-optic properties of the medium.

Although the present disclosure is described as relating primarily to electrophoretic displays, one of skill in the art could readily envision applying the systems and methods provided herein to other systems including other types of electro-optic displays.

In one aspect, the present disclosure provides an electrode to be used in an electro-optic display, the electrode comprising a liquid and a salt. The liquid and the salt are edible and "generally recognized as safe" ("GRAS").

The salt may be present in a concentration of between 300 mg of salt/gram of electrode and 25 mg salt/gram of electrode, for example between 200 mg of salt/gram of electrode and 100 mg salt/gram of electrode. In preferred embodiments, the salt is present in an amount suitable to achieve an electrical sheet resistance of below 10,000 ohms per square, such as less than 1000 ohms per square. The salt may be selected from the group consisting of sodium chloride, sodium iodide, potassium chloride, potassium iodide, magnesium chloride, and calcium chloride. The salt may be blended with additional materials or include additives, such as anti-caking agents. The salt may be of from a particular source, such as Kosher salt, sea salt, Himalayan pink salt, Celtic sea salt, fleur de sel, kala namak, flake salt, black Hawaiian salt, red Hawaiian salt, smoked salt, pickling salt, and combinations thereof. The liquid may be a sugar solution. The sugar solution may comprise any simple or complex sugar such as glucose, fructose, galactose, sucrose, lactose, or maltose. The sugar solution may be naturally-occurring, such as honey, syrup, nectar, or molasses, and combinations thereof. The liquid may be nonpolar. The electrode may further comprise a hydrogel or an organogel, wherein the liquid and the salt are enclosed within the hydrogel or the organogel. The electrode may have a visible light transmission (VLT) above 50%, e.g., above 60%, e.g., above 70%, e.g., above 80%, e.g., above 90%. The electrode may further comprise a flavor enhancer.

In another aspect, the present disclosure provides an article to be used in an electrophoretic display. The article comprises a first electrode, a second electrode, and an electrophoretic material; the electrophoretic material located between the first electrode and the second electrode. The first electrode, the second electrode, and the electrophoretic material are edible and "generally recognized as safe" ("GRAS") by the United States Food and Drug Administration ("FDA").

The first electrode, the second electrode, or both may comprise the electrode as described elsewhere herein. The first electrode, the second electrode, or both may be patterned to define pixels of a display. The pixels patterned on the first electrode, the second electrode, or both may be created using electrode dividers. The first electrode, the second electrode, or both may be patterned into elongate row electrodes and the other into elongate column electrodes running at right angles to the row electrodes. In some instances, the The electrophoretic material may comprise an internal phase, the internal phase comprising a first group of particles having electrophoretic mobility; and a plurality of microcapsules, the plurality of microcapsules each containing the internal phase and comprising a capsule wall, wherein the plurality of microcapsules are located between the first electrode and the second electrode.

The internal phase may further comprise an organic solvent. The organic solvent may be canola oil, soybean oil, corn oil, olive oil, palm oil, nut oil (peanut oil, coconut oil), seed oil (rapeseed oil, cottonseed oil, sunflower oil, sesame oil), plant extract (orange oil, lemon oil, acai oil) or mixtures thereof. The internal phase may also be colored with an edible oil-soluble colorant, such as carotenoids, chlorophyll, or other colored heme compound. In one embodiment, the internal phase includes a first group of particles having an electrophoretic mobility. Such a particle may comprise titanium dioxide, anthocyanins, carminic acid, carbon black, or anthraquinones. The article may further comprise a second group of particles having electrophoretic mobility within the internal phase, wherein the second group has a different color than the first group as well as an opposite charge polarity. The second group of particles having electrophoretic mobility may comprise, titanium dioxide, anthocyanins, carminic acid, carbon black, or anthraquinones. The internal phase may further comprise a third group of particles having electrophoretic mobility within the internal phase, wherein the third group has a different color than the first group and the second group. In some embodiments, two particles within the same internal phase will have the same charge polarity, but different charge magnitudes. That is, they will have different zeta potentials.

The article may further comprise a coloring agent within the internal phase, the coloring agent having a different color than the first group of particles. The coloring agent may be an oil soluble food color additive, e.g., a dye, pigment, or lake. The coloring agent may be an approved food dye, such as FD&C Blue No. 1, Blue No. 2, Green No. 3, Red No. 3, Red No. 40, Yellow No. 5, or Yellow No. 6. The internal phase may further comprising a charge control agent (CCA) within the internal phase. The charge control agent may be soy lecithin.

The capsule wall may comprise gelatin, acacia gum, cellulose, polysaccharides, alginates, dextran, chitosan, caseins, or combinations thereof. The electrophoretic material may further comprise a binder, wherein the plurality of microcapsules are located within the binder. The binder will typically be an edible composition such as a gelatin or a fatty-solid (e.g., lard or butter). In other embodiments, the capsules may be dispersed in a saturated sugar solution and cooled so as to harden into a solid. In other embodiments, the internal phase, including the electrophoretic materials, may be dispersed in small containers, such as a honeycomb structure. The honeycomb walls may comprise actual honeycomb made by bees, or it may comprise a starchy material and be formed using a press or a mold, or by 3D printing. The first electrode, the second electrode, or both may comprise a transparent electrode binder configured to secure the liquid electrode. The resulting conductive material may have a flexural modulus/elastic modulus of 2 GPa or smaller. At least one of the first electrode, the second, electrode, or the electrophoretic material may comprise a flavor enhancing substance.

In yet another aspect, the present disclosure provides a method of making an article to be used in a dynamic, electrophoretic display. The method comprises a first step of creating a first electrode and a second electrode, wherein the first electrode and the second electrode are both edible; and a second step of creating an electrophoretic material, the electrophoretic material located between the first electrode and the second electrode.

The second step of creating an electrophoretic material may comprise forming a plurality of microcapsules from coacervation of gelatin and acacia gum. The plurality of microcapsules may each comprise an internal phase and one or more groups of particles having electrophoretic mobility. The plurality of microcapsules may be combined using a crosslinking agent. The crosslinking agent may be transglutaminase.

In general, the electrode of the present disclosure can be used in an electro-optic display. The electrode comprises a liquid and a salt, wherein the liquid and the salt are both edible. The salt may be present in specific concentrations to provide desired material properties. For example, the salt may be present in a concentration of between 300 mg of salt/gram of liquid and 25 mg salt/gram of liquid, for example between 200 mg of salt/gram of liquid and 100 mg salt/gram of liquid. In preferred embodiments, the salt is present in an amount suitable to achieve an electrical sheet resistance of below 10,000 ohms per square, such as less than 1000 ohms per square. The salt may include a cation and an anion. The cation may be sodium, potassium, magnesium, calcium, or another similar positively charged ion. The anion may be chloride, carbonate, phosphate, or another similar negatively charged ion. For example, the salt may be sodium chloride.

The liquid present within the electrode may be a sugar solution. The sugar solution may comprise any simple or complex sugar such as glucose, fructose, galactose, sucrose, lactose, or maltose. The sugar solution may be naturally-occurring, such as honey, syrup, nectar, or molasses, and combinations thereof. The liquid may be nonpolar. In some embodiments, the flowable electrode material is a salted caramel sauce with higher-than-typical salt content. The electrode may comprise charge control agent (CCA). The electrode may be a hydrogel or an organogel with the liquid and salt enclosed within it.

The unique compositions and concentrations of the liquid and the salt may produce advantageous material properties. For instance, the electrode may comprise, consist essentially of, or consist of components in quantities that have been listed as safe for human consumption by the food additive status list or color additive list of the U.S. Food and Drug Administration. Additionally, the electrode may provide certain optical properties such as a high visible light transmission (VLT). The VLT of the electrode may be above 50%, 60%, 70%, 75%, 80%, 85%, 90%, or 95%.

The electrode may also include flavor enhancers, flavor additives, coloring agents, preservatives, as well as other food additives well-known in the art.

FIG. 1 shows a side view of an exemplary illustration of an article 100 to be used in an electrophoretic display, according to one aspect of the present disclosure. The article 100 has a first electrode 112, a second electrode 114, and an electrophoretic material 110, any of which can be edible. The electrophoretic material 110 is located between the first electrode 112 and the second electrode 114. The electrophoretic material may include a binder 111, which is edible and non-conductive, such as a polysaccharide, e.g., corn starch or alginate, or a hydrophobic material such as butter.

The first electrode 112, the second electrode 114, or both may comprise the electrode as described above. The first electrode 112, the second electrode 114, or both may be patterned to define pixels of a display. These pixels may be created using electrode dividers that create isolated pathways for the electrode within the first electrode 112, the second electrode 114, or both. Such electrode dividers may create pixels patterns with elongate row electrodes and the other into elongate column electrodes running at right angles to the row electrodes. For pixelation, edible metal leaf may be laid down in non-contacting segments and subsequently connected to a controller away from the foodstuff with edible electrodes to create an array of electrodes. An adhesive layer 116 may be included to help secure the liquid electrode in place.

The article 100 may also include flavor enhancers, flavor additives, coloring agents, preservatives, as well as other food additives well-known in the art.

The article 100 may have a microcavity electrophoretic display design. For example, the electrophoretic material 110 may have an encapsulated design with a plurality of microcapsules that each contain particles with electrophoretic mobility. The electrophoretic material 110 may further comprise a binder 111, wherein the plurality of microcapsules are located within the binder 111. Alternatively, the article 100 may have a microcell design with carrier medium having a plurality of cavities, each cavity containing particles with electrophoretic mobility. The microcells may be formed, for example from starch material with voids that has been dried to create suitable spaces for filling with internal phase.

As previously stated, all of the components present within the article 100 may comprise, consist essentially of, or consist of edible components. These components may have been listed as safe for human consumption by the food additive status list or color additive list of the U.S. Food and. Drug Administration.

Figure 2:
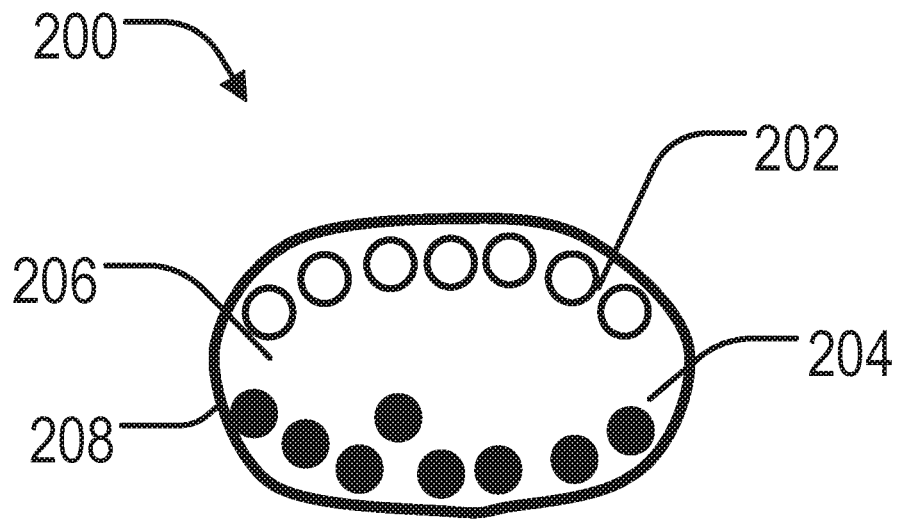
FIG. 2 is an exemplary illustration of a microcapsule, according to one aspect of the present disclosure.

Referring to FIG. 2, the electrophoretic material described herein may comprise a plurality of microcapsules, an exemplary single microcapsule 200 is depicted. The microcapsule 200 has a capsule wall 208 and an internal phase 206. The microcapsule 200 also has a first group of particles 202 having electrophoretic mobility. In this illustration, there is a second group of particles 204 having electrophoretic mobility. In the embodiment of FIG. 2, the first and second particles have opposite charges. The capsule wall may comprise gelatin, acacia gum, hydroxymethylcellulose, or combinations thereof.

The internal phase 206 may comprise an edible lipophilic solvent as described above. The internal phase 206 may also comprise a charge control agent. The CCA may be compatible with the solvent in the electrophoretic dispersion and may interact with the surface of the first group of particles 202, the second group of particles 204, or both to effectively generate either positive or negative charge. The charge control agent may be soy lecithin, or a fatty acid, or a commercial edible surfactant, such as polysorbate 80.

The first group of particles 202 having electrophoretic mobility may comprise titanium dioxide, anthocyanins, carminic acid, carbon black, or anthraquinones. The second group of particles 204 having electrophoretic mobility within the internal phase may have a different coloration, lightness, or both than the first group of particles 202. The second group of particles 204 may have a different charge than the first group of particles 202, for example, one may be positively charged and the other negatively charged. The second group of particles 204 having electrophoretic mobility may comprise black titanium dioxide. Additionally, the electrophoretic material may have additional groups of particles having electrophoretic mobility. Each additional group of particles may have unique and different coloration, lightness, or both than the first group of particles 202 and the second group of particles 204. Each additional group of particles may have a unique charge that differs from the charge of the first group of particles 202 and the second group of particles 204. It is also possible to dye particles to achieve a desired particle color using GRAS dyes, including FD&C Blue #1, FD&C Blue #2, FD&C Green #3, FD&C Red #3, FD&C Yellow #5, and FD&C Yellow #6, as well as plant and animal based colorants, such as beet juice and cochineal extract.

Figure 3:
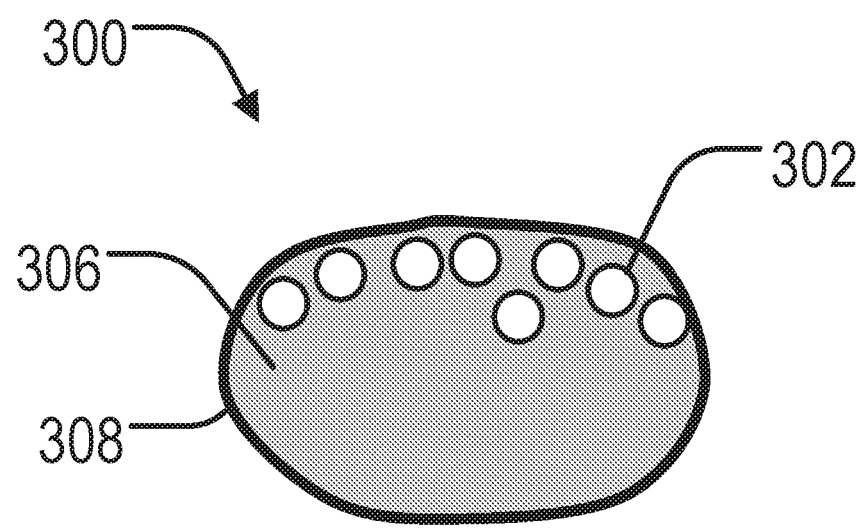
FIG. 3 is another exemplary illustration of a microcapsule, according to one aspect of the present disclosure.

Referring to FIG. 3, another exemplary microcapsule 300 is depicted. The microcapsule 300 has a capsule wall 308 and an internal phase 306. The microcapsule 300 also has a first group of particles 302 having electrophoretic mobility. In this illustration, the microcapsule 300 has a similar construction to that of FIG. 2, the difference being the internal phase 306 which comprises a coloring agent. The coloring agent has a different color, lightness, or both than the first group of particles. The coloring agent may be an oil soluble food color additive. For example, a coloring agent may contain anthocyanins, canthaxanthin, chlorophyll, cochineal, iron oxide, paprika, saffron, turmeric, or combinations thereof. The embodiments of FIGS. 2 and 3 can be combined in that a capsule can be created with multiple different types of particles, e.g., 202 and 204, in addition to a colored internal phase 306.

Figure 4:
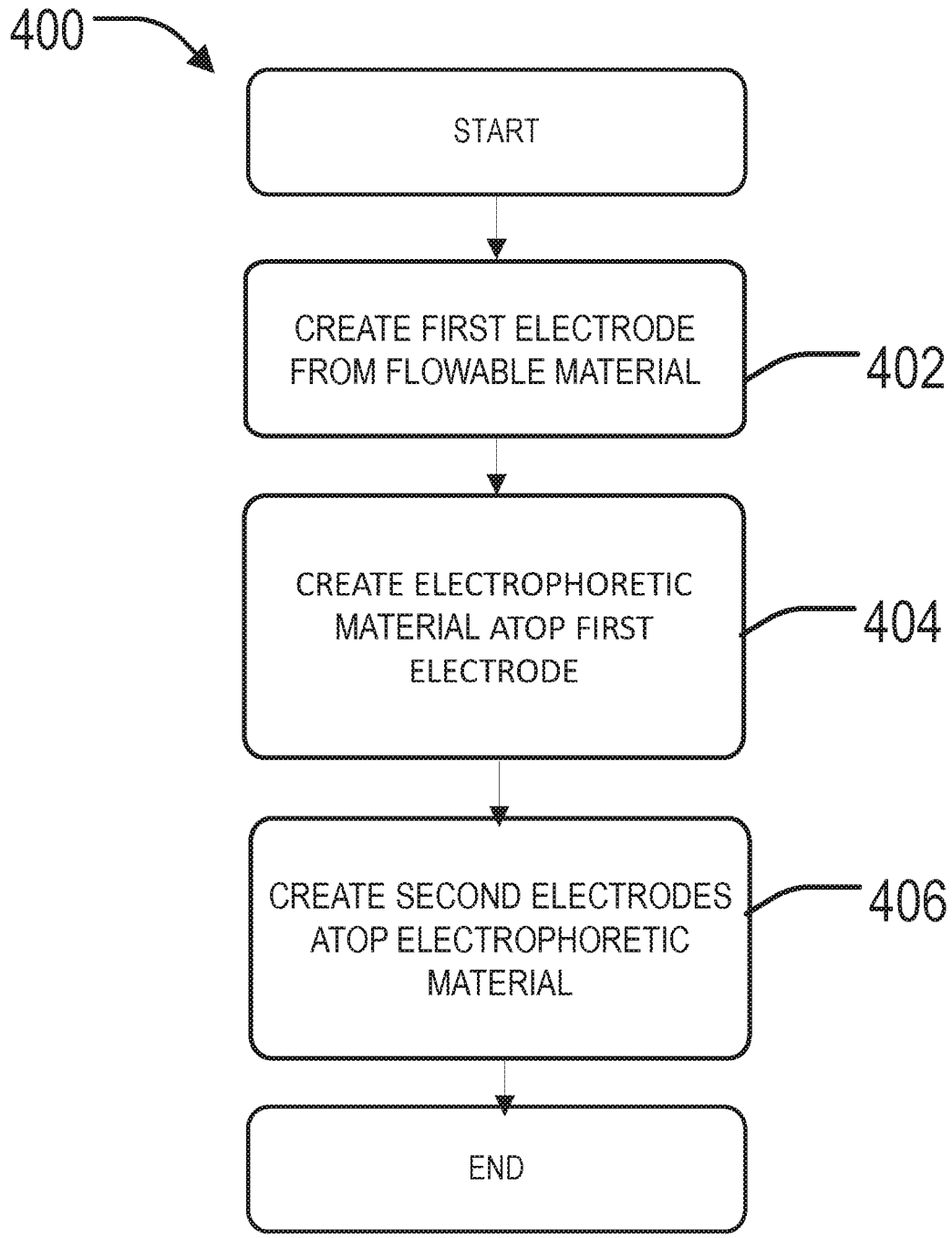
FIG. 4 is a process flow diagram of a method of making an article to be used in an electrophoretic display, according to one aspect of the present disclosure.

FIG. 4 shows a process flow diagram 400 for a method of making an article to be used in an electrophoretic display. At process block 402, the method 400 includes creating a first electrode, such as those described herein. At process block 404, the method 400 includes creating an electrophoretic material atop the first electrode. This may be accomplished by spraying or spreading the electrophoretic material. Once the electrophoretic material is placed, the second edible electrode is placed on the electrophoretic material at process block 406 to create an edible switching stack.

Figure 7:
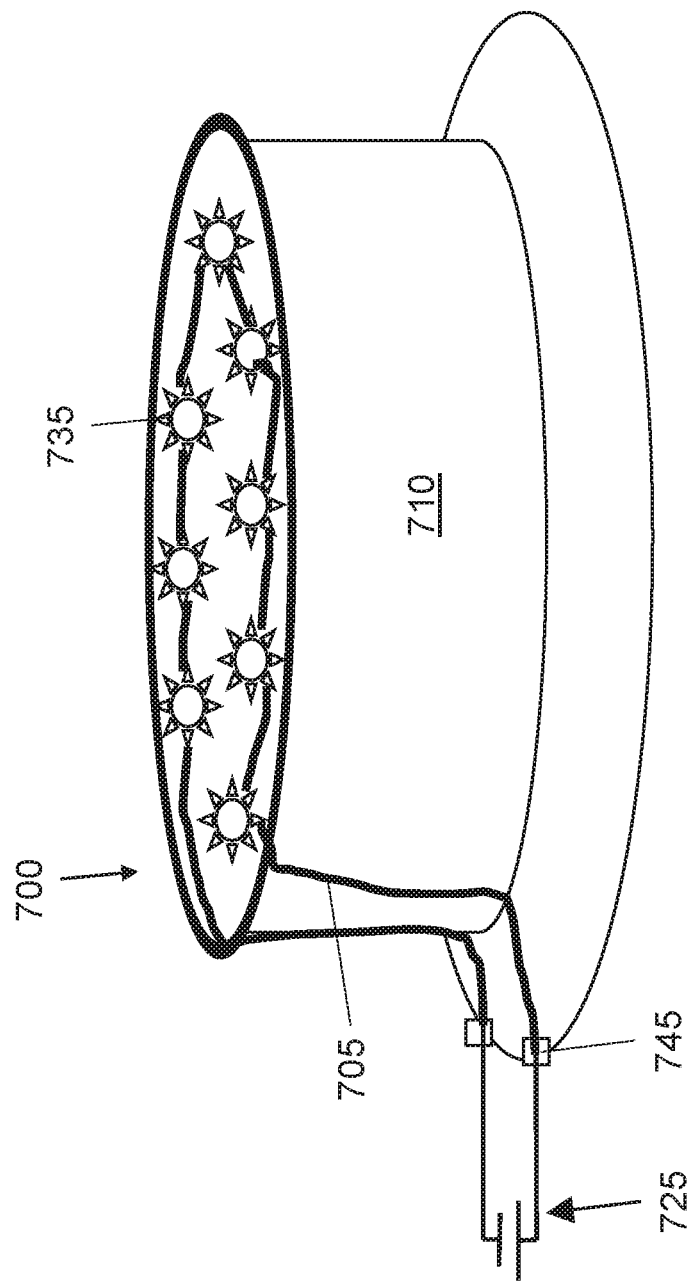
FIG. 7 illustrates the use of a flowable electrode of the invention to provide an electrical connection between a power source and a plurality of light-emitting diodes that have been arranged on a birthday cake.

FIG. 7 is an exemplary illustration of a birthday cake 700 that includes edible connections 705 constructed from a flowable electrode material. As illustrated in FIG. 7, the birthday cake 700 includes a common cake material covered with a frosting 710. Using flowable electrode materials of the invention, edible connections 705 can be drawn on the top of the cake, e.g., with a decorating tube. A plurality of light emitting diodes (LED)s 735 can be stuck into the frosting 710 so that a circuit is created from a power source 725 through the edible connections 705 to the LEDs 735. The birthday cake 700 of FIG. 7 is easily powered by, e.g., a 9V battery, which may be connected with regular wires that are coupled to the edible connectors 705 via terminals 745. While the LEDs 735 are not edible in this embodiment, the wiring is edible so that it is merely a matter of plucking off the LEDs as is commonly done with birthday candles. This construction provides a festive alternative for instances where open flames are not allowed. An additional benefit is that when the cake is cut, the circuit is broken and the lights turn off.

As used herein, the term edible is used in its conventional meaning as being safe for human consumption and fit to be eaten. Something described as edible may be "generally recognized as safe" ("GRAS") by the United States Food and Drug Administration ("FDA") and flavors approved by the FDA for use in foods for human consumption. In particular, food safe ingredients include those ingredients listed as approved under 21 C.F.R. §§ 70, 73, 74, 170, 172, 177, 182, and 184 as of the final rule issued in 81 FR 54959 effective Oct. 17, 2016. In general, the component described as edible may need to be on either the food additive status list or color additive list of the U.S. Food and Drug Administration. Unless the context specifically dictates otherwise, all components of the systems of the present disclosure can be constructed from edible materials.

As used herein, the term "electro-optic", as applied to a material or a display, is used in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

As used herein, the term "gray state" refers to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

As used herein, "bistable" and "bistability" refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

EXAMPLES

The following Examples are provided in order to demonstrate and further illustrate certain embodiments and aspects of the present disclosure and are not to be construed as limiting the scope of the disclosure.

Example 1

Figure 5:
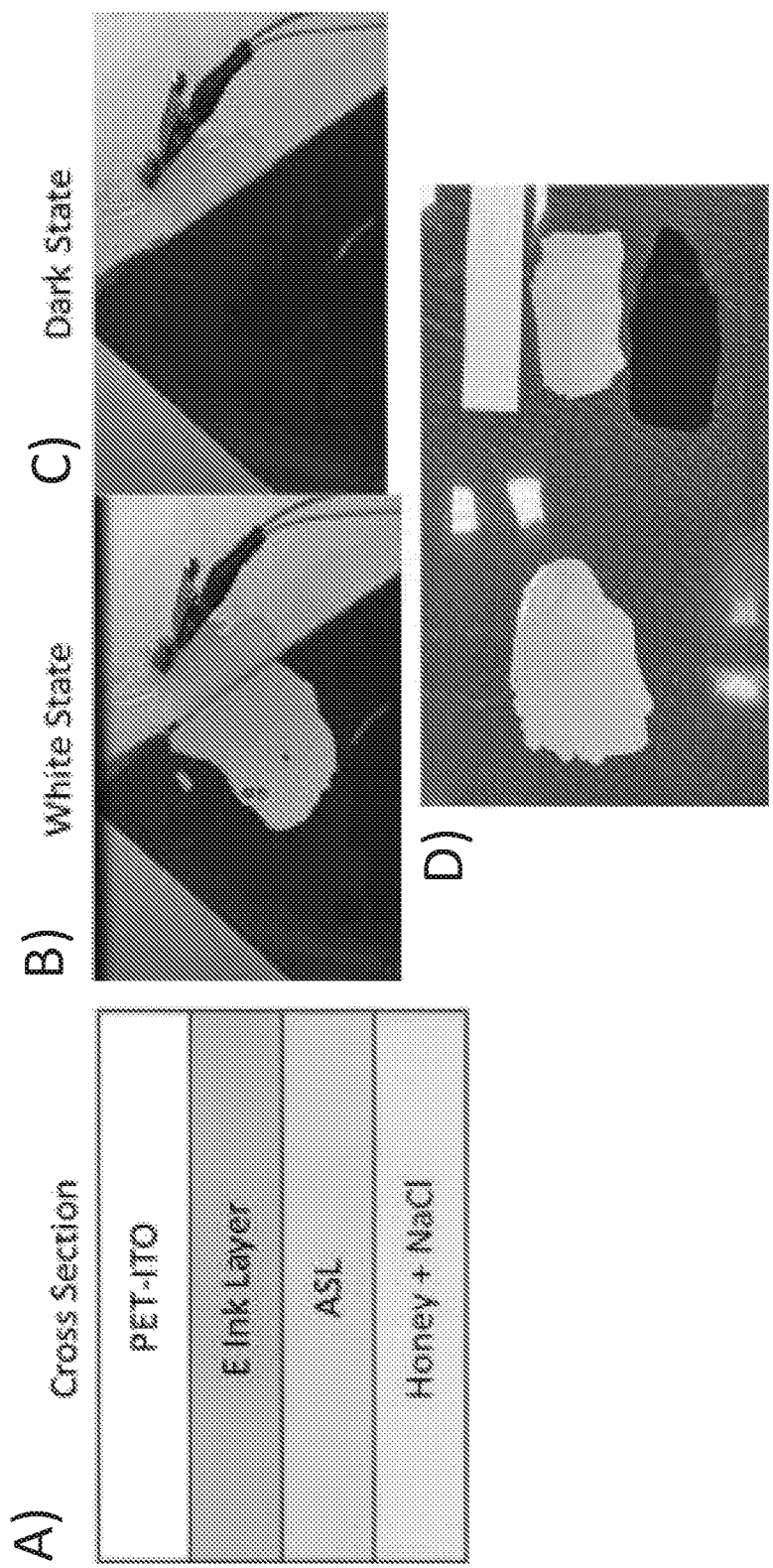
FIG. 5 depicts three experimental images as well as a side view of an exemplary illustration of the article used in the experiment. Illustration A) shows the exemplary illustration including the material construction of the article. Image B) shows an experimental "white state" resulting from a specific charge being applied to the "Honey+NaCl" layer of the article. Image C) shows an experimental "dark state" resulting from a different specific charge being applied to the "Honey+NaCl" layer of the article. Image D) shows both "light state" and "dark state" patches resulting from isolated charges applied to different areas of the article.

As shown in FIG. 5, the effectiveness of a liquid electrode comprising honey and sodium chloride was tested in an experimental article. The experimental article, as depicted in illustration A), contained a polyethylene terephthalate-indium tin oxide (PET-ITO) first layer, an electrophoretic second layer which contained standard electrophoretic display particles distributed in an organic solvent, a lamination adhesive (ASL) and a liquid (edible) electrode fourth layer. A positive voltage (with respect to the PET-ITO layer) was applied to the liquid electrode and image B) was then photographed. As can be seen, an experimental "white state" resulted from the positive charge present within the "Honey+NaCl" layer of the article, proving that a mixture of honey and NaCl is a viable electrode for an electrophoretic display. A negative voltage was then applied to the liquid electrode and image C) was then photographed. As can be seen, an experimental "dark state" resulted from the negative charge present within the "Honey+NaCl" layer of the article. Image D) shows both "light state" and "dark state" patches resulting from multiple repetitions of this experiment at different locations on an experimental article of similar construction. Although, the layers besides the liquid electrode are not made entirely of edible materials in this experiment, one of skill in the art could envision readily substituting them for edible materials using the systems and methods of the present disclosure.

Example 2

Figure 6:
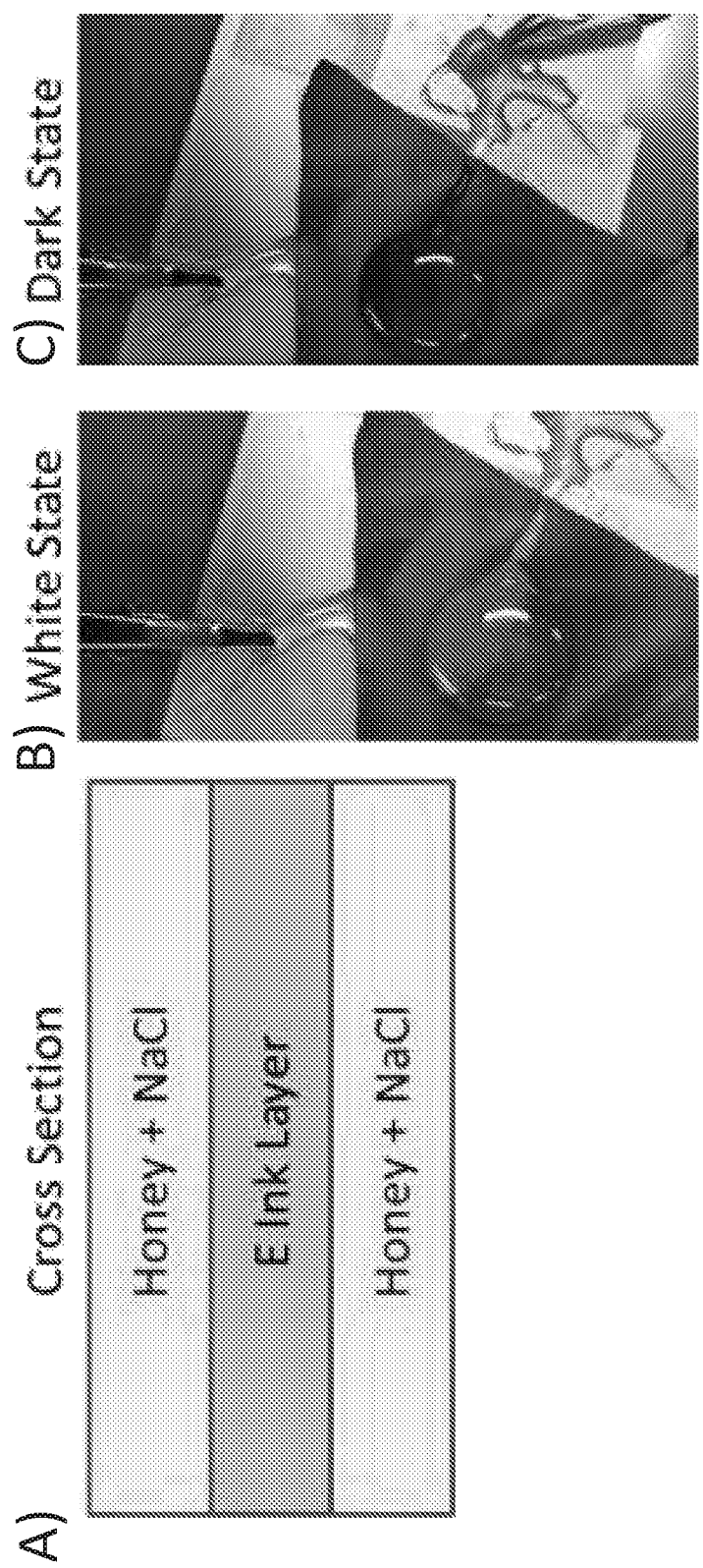
FIG. 6 depicts two experimental images as well as a side view of an exemplary illustration of the article used in the experiment. Illustration A) shows the exemplary illustration including the material construction of the article. Image B) shows an experimental "white state" resulting from specific charges being applied to the "Honey+NaCl" layers of the article. Image C) shows an experimental "dark state" resulting from different specific charges being applied to the "Honey+NaCl" layers of the article.

As shown in FIG. 6, the effectiveness of a liquid electrode comprising honey and sodium chloride was tested in an experimental article. The experimental article, as depicted in illustration A), contained a liquid electrode first layer on top, electrophoretic second layer, which contained standard electrophoretic display particles distributed in an organic solvent, and a liquid electrode third layer on bottom. A negative charge was applied to the first layer and positive charge was applied to the third layer before image B) was photographed. As can be seen, an experimental "white state" resulted from the charge difference present between the two electrode layers. A positive charge was applied to the first layer and negative charge was applied to the third layer before image C) was photographed. As can be seen, an experimental "dark state" resulted from the charge difference present between the two electrode layers. Although, the electrophoretic material is not made entirely of edible materials in this experiment, one of skill in the art could envision readily substituting them for edible materials using the systems and methods of the present disclosure.

Thus, the present disclosure provides systems and methods relating to liquid electrodes and articles constructed therefrom that can be used to make edible electrophoretic displays.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

I claim:

1. An edible electro-optic display comprising:
a first electrode;
a second electrode; and
an electro-optic material, the electro-optic material located between the first electrode and the second electrode;
wherein the first electrode, the second electrode, and the electro-optic material are edible and generally recognized as safe (GRAS).

2. The edible electro-optic display of claim 1, wherein the first electrode, the second electrode, or both electrodes comprise a flowable electrode material comprising a liquid and a salt, wherein the salt is present at a concentration of between 300 mg salt/g liquid and 25 mg salt/g liquid, and the liquid and the salt are edible and generally recognized as safe.

3. The edible electro-optic display of claim 1, wherein the first electrode, the second electrode, or both is patterned to define pixels of the edible electro-optic display.

4. The edible electro-optic display of claim 1, wherein the first electrode, the second electrode, or both is patterned into elongate row electrodes and the other into elongate column electrodes running at right angles to the row electrodes.

5. The edible electro-optic display of claim 1, wherein the electro-optic material comprises:
an internal phase, the internal phase comprising a first group of colored particles having an electrophoretic mobility; and
a plurality of microcapsules, the plurality of microcapsules each containing the internal phase and comprising a capsule wall, wherein the plurality of microcapsules are located between the first electrode and the second electrode.

6. The edible electro-optic display of claim 5, wherein the internal phase further comprises an organic solvent.

7. The edible electro-optic display of claim 6, wherein the organic solvent comprises canola oil, soybean oil, corn oil, olive oil, palm oil, peanut oil, coconut oil, rapeseed oil, cottonseed oil, sunflower oil, sesame oil, orange oil, lemon oil, or acai oil.

8. The edible electro-optic display of claim 5, wherein the first group of particles having an electrophoretic mobility comprises titanium dioxide, anthocyanins, carminic acid, carbon black, or anthraquinones.

9. The edible electro-optic display of claim 8, further comprising a second group of particles having electrophoretic mobility within the internal phase, wherein the second group has a different color than the first group.

10. The edible electro-optic display of claim 9, wherein the second group of particles having electrophoretic mobility comprises titanium dioxide, anthocyanins, carminic acid, carbon black, or anthraquinones.

11. The edible electro-optic display of claim 5, further comprising a coloring agent within the internal phase, the coloring agent having a different color than the first group of particles.

12. The edible electro-optic display of claim 11, wherein the coloring agent is an oil soluble food color additive.

13. The edible electro-optic display of claim 5, further comprising a charge control agent within the internal phase.

14. The edible electro-optic display of claim 13, wherein the charge control agent is soy lecithin.

15. The edible electro-optic display of claim 5, wherein the capsule wall comprises gelatin, acacia gum, cellulose, polysaccharides, alginates, dextran, chitosan, caseins, or combinations thereof.

* * * * *